US008807408B2

(12) United States Patent
Kreis

(10) Patent No.: US 8,807,408 B2
(45) Date of Patent: Aug. 19, 2014

(54) ADAPTIVE STORAGE AREA

(75) Inventor: Raimund Kreis, Vilsbiburg (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 306 days.

(21) Appl. No.: 13/384,113

(22) PCT Filed: Jun. 9, 2010

(86) PCT No.: PCT/EP2010/058059
§ 371 (c)(1),
(2), (4) Date: Feb. 22, 2012

(87) PCT Pub. No.: WO2011/006714
PCT Pub. Date: Jan. 20, 2011

(65) Prior Publication Data
US 2012/0138649 A1    Jun. 7, 2012

(30) Foreign Application Priority Data

Jul. 16, 2009 (DE) .......................... 10 2009 033 415

(51) Int. Cl.
*B60R 7/06* (2006.01)
(52) U.S. Cl.
USPC ........... 224/539; 224/540; 224/549; 224/552; 224/567; 296/37.8; 296/37.12; 248/309.1
(58) Field of Classification Search
USPC ......... 224/400, 282, 539, 543, 545, 552, 556, 224/549, 563, 567, 540; 296/37.1, 37.8, 296/37.12, 37.13; 248/309.1, 313, 316.7; 211/85.7, 119.004, 34–38
See application file for complete search history.

(56) References Cited

U.S. PATENT DOCUMENTS

| 2,074,843 | A | | 3/1937 | Hiering |
| 2,150,627 | A | | 3/1939 | Lieber |
| 4,000,520 | A | * | 1/1977 | Svendsen et al. ................. 2/418 |
| 5,054,733 | A | * | 10/1991 | Shields .......................... 248/313 |
| 5,170,980 | A | * | 12/1992 | Burrows et al. ............ 248/311.2 |
| 5,261,716 | A | | 11/1993 | Phelps |
| 5,474,272 | A | * | 12/1995 | Thompson et al. ........ 248/311.2 |
| 5,799,847 | A | * | 9/1998 | Sandor ........................... 224/197 |
| 6,230,948 | B1 | * | 5/2001 | Steiger et al. ................. 224/539 |

(Continued)

FOREIGN PATENT DOCUMENTS

| DE | 23 42 573 A1 | 3/1975 |
| DE | 29 10 144 A1 | 9/1980 |

(Continued)

OTHER PUBLICATIONS

International Preliminary Report on Patentability, mailed Jan. 17, 2012, for PCT/EP2010/058059 (6 pages).
International Search Report for International application No. PCT/EP/2010/058059, dated Sep. 11, 2010 (3 pages).

*Primary Examiner* — Justin Larson
*Assistant Examiner* — Scott McNurlen
(74) *Attorney, Agent, or Firm* — Wolf, Greenfield & Sacks, P.C.

(57) ABSTRACT

A storage area, particularly for vehicles, comprising a frame having opposite legs and a plurality of bars extending from one of the opposite legs of the frame to the other leg. The bars are each implemented as a detented system, so that they can be displaced independently of each other between a starting position and an ending position.

19 Claims, 4 Drawing Sheets

(56) References Cited

U.S. PATENT DOCUMENTS

| | | | |
|---|---|---|---|
| 6,250,527 B1 * | 6/2001 | Mizue et al. | 224/281 |
| 6,315,153 B1 * | 11/2001 | Osborn | 220/737 |
| 6,863,200 B2 * | 3/2005 | Beglau | 224/482 |
| 7,213,793 B2 * | 5/2007 | Sturt et al. | 248/311.2 |
| 7,997,635 B2 | 8/2011 | Ercolano et al. | |
| 8,480,151 B2 * | 7/2013 | Gaudig et al. | 296/37.8 |
| 2004/0010891 A1 | 1/2004 | Byers | |
| 2005/0194506 A1 * | 9/2005 | Lang et al. | 248/311.2 |
| 2008/0272259 A1 | 11/2008 | Zavattieri et al. | |
| 2010/0155441 A1 * | 6/2010 | Gaudig et al. | 224/282 |

FOREIGN PATENT DOCUMENTS

| | | |
|---|---|---|
| DE | 103 26 883 A1 | 1/2005 |
| DE | 10 2008 021679 A1 | 11/2008 |
| DE | 10 2008 024691 A1 | 11/2009 |
| JP | 9-70333 A | 3/1997 |
| JP | 10-24770 | 1/1998 |
| WO | WO 2006/100390 A1 | 9/2006 |

* cited by examiner

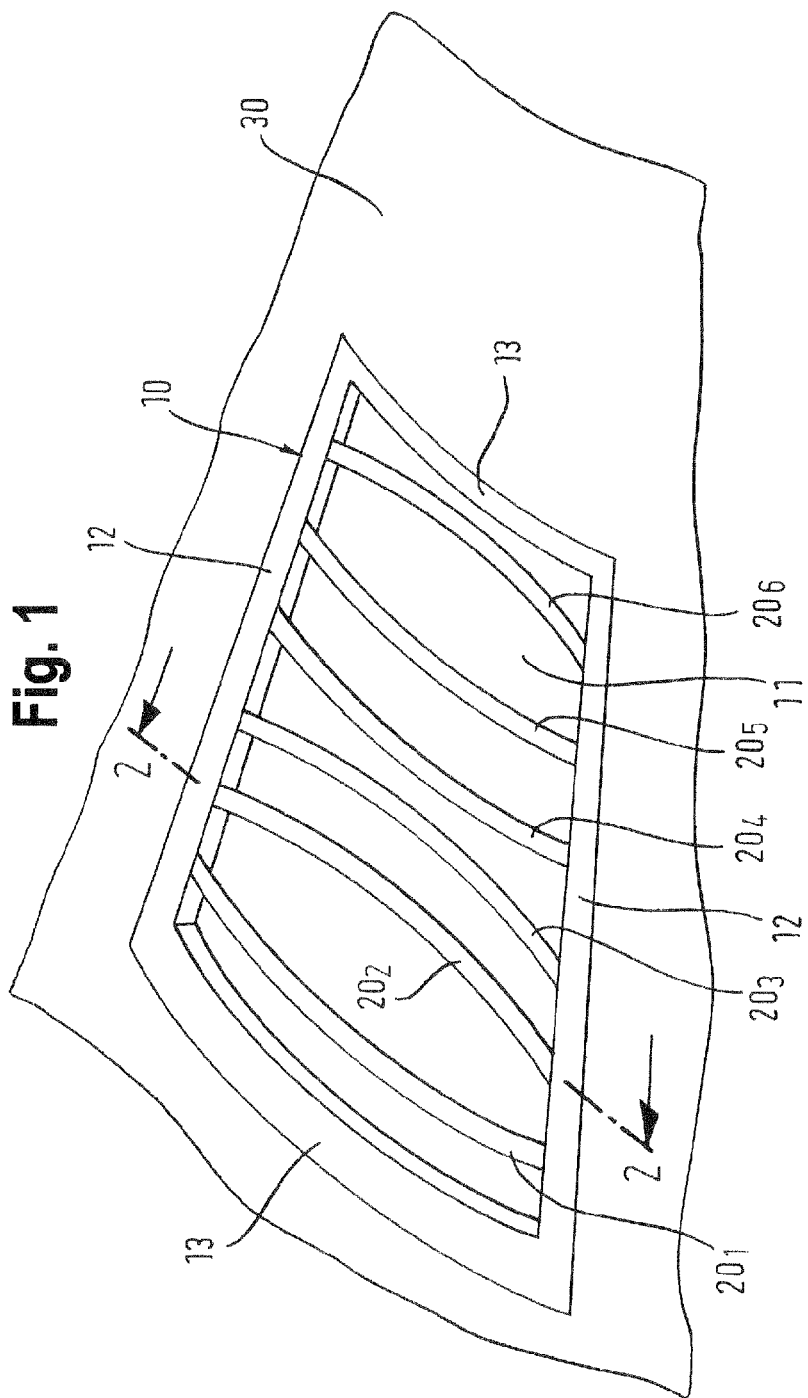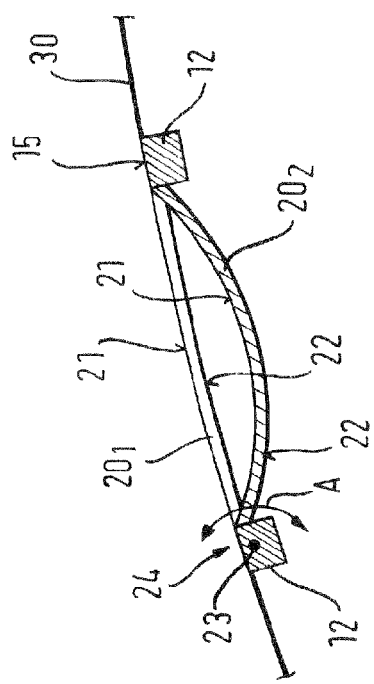

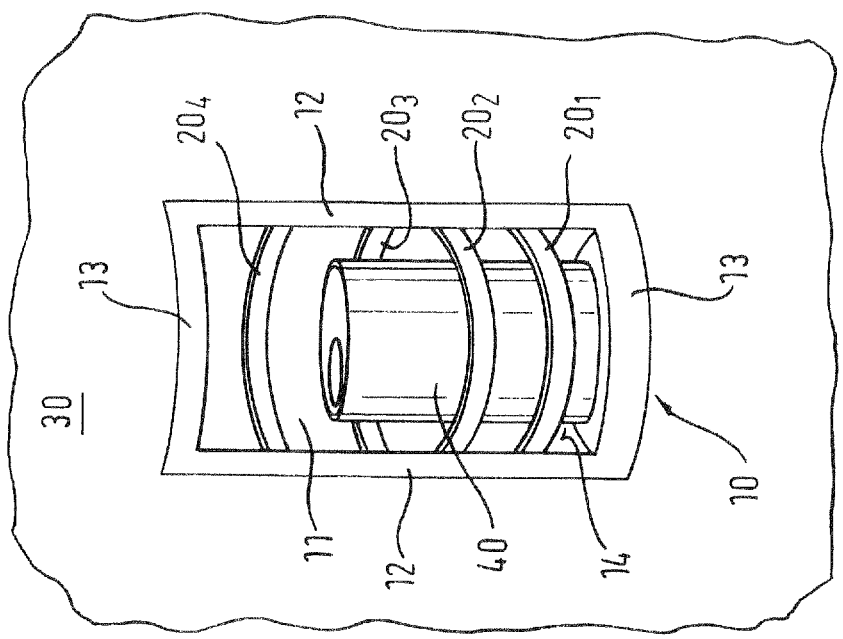
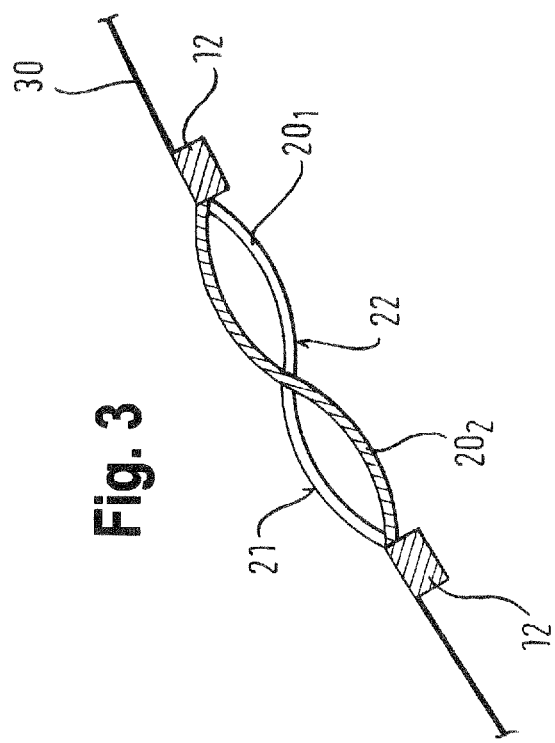

ADAPTIVE STORAGE AREA

RELATED CASE INFORMATION

This application is a 371 US National Stage Application of International Application No. PCT/EP2010/058059, filed on Jun. 9, 2010, claiming priority to German application no. DE 10 2009 033 415.7, filed on Jul. 16, 2009, the entire disclosures of which are incorporated herein by reference.

The present invention relates to storage areas which are used particularly in vehicles and specifically in cars. However, their use is also conceivable in other vehicles such as aircraft and watercraft. Within the meaning of the present invention, storage areas are understood on one hand to be any open receptacles which are used for inserting or placing objects into and, on the other, as freely accessible surfaces which allow something to be placed or laid on them. In particular, the present invention relates to storage areas in the passenger compartment or boot area of vehicles.

A great diversity of such storage areas is known.

Particularly given the anticipated introduction of electric vehicles, there are reports of an increasing trend towards weight- and space-efficient in-vehicle equipment.

The object of the present invention is therefore to create a storage area which satisfies this trend and is thus a storage area which is adaptively adjustable to the user's requirements, is weight-saving, can be manufactured inexpensively and enables an aesthetically appealing design.

This object is achieved by a storage area with the features of claim 1. Advantageous further embodiments are referred to in the dependent claims.

The present invention is based on the idea of providing at least two bars, each of which is configured as a bi-stable system, spanning an opening defined by a frame, wherein the bars each have a stable starting and ending position between which they are movable. Thus, for example, a bar which is in the ending position may form an open receptacle. If, for example, two or more of the bars, which are arranged directly next to each other, are in the ending position, the result will be a correspondingly larger receptacle. If, for example, three or more bars are provided, the bars arranged on the outside in each case may be moved into the ending position while the bar or bars in the centre remain in the starting position by means of which two separate open receptacles may be created. Therefore, a storage area is created by means of the present invention that is easily adaptable to the user's requirements, can be manufactured inexpensively and enables an appealing external design. At the same time, the assembly can be configured with lower weight and is therefore energy-efficient, particularly when used in vehicles and here electric vehicles.

Accordingly, the present invention creates a storage space of the type referred to at the outset which comprises a frame. In this case, for example, the frame may be integrated in the vehicle's dashboard (integrally or bonded in). The frame defines an opening of any shape. The opening is restricted in each case by two opposing legs or edges. A plurality of bars (at least two) which extend from one of the opposing legs of the frame to the other leg are arranged between two of the opposing legs. At the same time, the bars may be configured in cross-section to be round (circular, oval, etc.) or angular (triangular, square, rectangular, multiangular, etc.) and/or flat (i.e. wider than they are high). The bars may also have different profiles (wedge profile, etc.) or non-uniform contours in order to influence the bending line. It is further conceivable to let two different materials merge into each other, particularly in order to render the storage area's degree of hardness variable. The bars and also the frame may be formed of plastic or metal. According to a preferred embodiment, the plurality of rods run parallel to each other. However, it is also conceivable for the bars to extend at an angle ($\neq 0°$, $180°$) to each other. The bars are configured as a bi-stable system in each case. In this case a bi-stable system is to be understood in that the bars can each (only) adopt two possible states, a starting position and an ending position, but are (only) transferable from one to the other state by means of an external impulse. So that the adaptivity referred to above will be achievable, the bars are movable between the starting position and the ending position independently of each other. Euler's buckling modes and beam theory help when designing the bi-stable system.

To form the base of the open receptacle and at the same time to ensure an aesthetically pleasing outer appearance of the storage area, it is preferable according to one embodiment to provide a covering which is arranged at least in the region of the opening defined by the frame, i.e. which closes the opening defined by the frame. Purely by way of example, fabrics, flat materials (a single-ply or multiple-ply polymer layer of PU and/or PVC), leather, etc. are conceivable here. The frame is preferably also spanned by the covering and if necessary also the component surrounding the frame, i.e. the component in which the frame is integrated (e.g. the dashboard). In this case, it is especially preferable to arrange the covering over the bars for a closed surface, i.e. the covering rests on the bars. However, it is also conceivable to arrange the covering underneath the bars. If the covering is arranged over the bars, then there is generally no need for the covering to be joined to the bars but may nevertheless be provided. If the covering is arranged underneath the bars, then it is generally advisable to join the covering to the bars. By way of example, the bars might also be worked into the covering, e.g. be sewn in or glued. If no covering is provided overall, then an inherently stable base or rear wall is generally configured underneath the opening formed by the frame.

The covering is preferably designed to be reversibly extensible (elastically deformable) in order to ensure a crease-free surface of the covering in any states of the bars. The covering also ensures abrasion resistance and contributes to dimensional stability.

In addition, the bars or their covering may consist of decorative materials familiar in interiors, e.g. veneer, foil, leather, printed surfaces, etc., provided that they include the properties referred to above or provided that appropriate hinge functions are provided.

Moreover, the impulse to bring the bars from the starting position into the ending position or vice versa may be manual. In this case it is preferable to provide a handle which facilitates manual movement of the bars. If a covering is provided over the bars, the handle may be provided on the covering and e.g. may be by means of sewn on tabs/rings/loops. This also applies if the bars are integrated in the covering as was mentioned above. If, however, the covering is arranged underneath the bars, then the handle may be achieved by means of the bars themselves or by means of an appropriate configuration on the bars. Additionally, in the case of rotatably mounted bars, a positioning mechanism may be provided, e.g. by means of a wheel or a lever on the mounting.

It is also frequently advantageous if a rear wall is configured bonded to the frame or adjoining it which may be designed with a concave curve or may be shaped toward the rear. This rear wall may be necessary to accommodate the bi-stable bars in one of the two stable positions, i.e. the starting position or ending position. At the same time it is conceivable that the change from one position to the other will take place by means of s-shaped snapping through of the bars (see also FIG. 3 later). In addition to concave curved rear walls, however, straight or convex curved rear walls from which the bars are unfolded to form a storage area are also conceivable. Regardless of the design of the rear wall, it is often desirable for design reasons to configure storage areas to be retractable flush with the surface. To achieve this, the bars may be configured to fit very closely to the rear wall or be enclosed flush with the surface but they must remain operable for the user. For this purpose, it is conceivable to provide one or a plurality of recesses, preferably two recesses, in the rear wall which make it easier to pull out the bars when they lie against the back wall. The recesses may be executed as finger recesses or a hand recess to ensure intrusion between the bar and the rear wall.

As a further function of the recess, it may also serve to accommodate objects of the bars protruding correspondingly towards the rear wall, e.g. rubber studs in a semi-cylindrical shape. The convexity of the recess itself may also prevent bottles from slipping. The recess may be configured over the frame's entire extension between opposing legs or may be introduced only locally. In particular, for an adjustability of the bars along the legs which is described later, it is preferable to provide the recess or recesses over the entire length of the legs. If the rear wall is curved, it is advantageous for the recess or recesses to lie ideally between the highest point of the curved bar and the bar's lateral guide. Due to pretensioning and s-shaped snapping through of the bars, the operating forces are lowest at this point such that moving the bars between the positions is easily achieved.

For guidance of the bars it is conceivable, particularly when using concave curved rear walls, merely to provide a rotatable mounting of each of the ends of the bars. The simplest way in this case has proven to be cylinders which are injection moulded onto the bars or which may be joined to them in some other way, e.g. glued. The cylinders may be guided in corresponding concave channels in the frame or if necessary in the rear wall or between frame and rear wall. Due to pretensioning, the bars spread at right angles to the elongated guides which correspondingly run parallel to the central axis of the cylinders such that they can absorb forces in the guiding direction.

The pivot angle from the starting to the ending position and vice versa is generally significantly smaller than 180°. The guide may enclose the cylinder by more than 180° to prevent the cylinders from being pulled out of the guide in the event of abuse or a crash. To enable replacement of the bars from the visible side or for installation in the case of guides closed top and bottom, the cylinder may be flattened on both sides to permit the cylinder to be manoeuvered out of the guide in an intermediate position between the starting and the ending position. Consequently, it is possible to remove the bars in the intermediate position which may also be described as the installation position. This position is passed through on snapping through the bars from the starting to the ending position and vice versa, whereby the transverse forces, as described above, ensure that the cylinders are pressed into the guides and this prevents them from slipping out. In the stable positions, the starting and ending positions, the cylinders are securely enclosed and therefore prevented from slipping out. Alternatively snap-in connections are conceivable, i.e. the guide is configured as a snap-in connection with a circumferential angle of a little more than 180° in conjunction with full cylinders, whereby the cylinders snap into the guide on "bending open" of the guide and are then held in the guide.

Advantageously, the guides run over the entire length of the frame's leg or legs. This makes it possible for the bars to move relative to each other in the guide and correspondingly to adapt optimally to the desired configuration and design. It may be preferable to use different bars to further increase this flexibility. For example, a wide bar with flexible base may be provided which forms an opaque box in the folded out position (ending position). It should be noted that the resisting moment against bending (axial area moment of inertia) increases linearly with the width and cubically with the material thickness for rectangular cross-sections. If it is no longer feasible to reduce the material thickness, wide bars may be perforated or open-worked to keep the operating forces low. A thin flexible covering of the bar using foils, materials, etc. may ensure opacity. In addition or alternatively, a narrow bar with a flexible base may be provided which may be arranged above the wide bar and may serve as a lid for the receptacle then created by the wide bar. Alternatively, the wide bar and the narrower bar each with flexible base may form storage areas open at the top. The configuration above emerges in particular if the legs of the frame run vertically (see later). Alternatively or additionally, a further narrow bar without flexible base may be present which may serve as a retaining strap for wedging in objects.

With a continuously unbroken guide along the leg, it is further conceivable to alter the position of the individual bars by moving them along the guide and thus to make an optimum adaptation. For bars with flexible bases, i.e. whereby the base, for example, is formed from a resilient material which stretches on folding out the bar and creates a compartment base, it is preferable for this purpose to hold the flexible base on one side relative to the guides or the bars such that it does not rotate with the guides or ends of the bar but is held along the rear wall in each case.

Moreover, the s-shaped snapping through of the pretensioned bars is obstructed when using a straight rear wall. To prevent this, the rear wall could be designed as s-shaped such that the bending elements can lie against the rear wall in an intermediate position. There is a risk however, that the bar will snap back out of this position. Additional detachable retaining elements would then be necessary. A solution to this problem exists in configuring the rotatable mounting of the bi-stable bars, which is actually only described above, to be additionally movable on one or both sides. This is necessary because the bars are not essentially extensible longitudinally and are only flexible to bending. In this case, the bar may be movably held relative to the rotatable mounting, i.e. one end of the bar can move relative to the mounting or the bearing itself is designed to be movable.

Alternatively to the manual operation above, however, it is also conceivable to switch automatically between the stable states (starting position and ending position). In other words, it is conceivable for the storage area to comprise a positioning device for automatically moving the bars between the starting position and the ending position. This may, for example, comprise a drive by way of which at least one end of each bar or its mounting is movable in the longitudinal direction of the relevant bar and/or is rotatable about an axis perpendicular to the longitudinal direction or extension in order to move the bar between the starting position and the ending position.

If both bar ends each have rotary drives, which are moved and/or restricted in the same direction, s-shaped bending lines are possible as the intermediate position between the stable ending positions. These intermediate positions are also possible with purely manually operable storage areas due to known detents or locking mechanisms in the mountings of the bar ends.

Alternatively, it is also conceivable to form the bars at least in portions from a shape memory material or shape memory alloys. In this case, the positioning device comprises an activation device for activating the shape memory material in order to move the bars between the starting position and the ending position.

With automatic switching of each of the bars, it is especially preferable for the positioning device to comprise an input unit via which individual bars are selectable and movable independently of each other and/or predefined position patterns of the bars in relation to each other are selectable. That is to say, the user may move individual bars independently of each other from the starting position into the ending position in order to form an appropriate storage space which meets his requirements. Alternatively or additionally, there is the possibility of selecting specified position patterns. For example, with three bars in a predefined position pattern, all the bars can be brought into the ending position or, according to a different pattern, only the outer bars while the middle bar remains in the starting position in order to form two separate storage compartments as referred to above. In yet another position pattern, the middle and one outer bar could be moved into the ending position while the remaining bar stays in the starting position, etc.

According to a preferred and especially inexpensive and installation-friendly embodiment of the present invention, the frame and the bars are configured integrally, using the in-mould assembly method for example, whereby in this case the frame and the bars can be manufactured in articulated arrangement to each other in one injection moulding process step.

Alternatively, however, it is also conceivable to configure the bars separately from the frame. In this embodiment, it is particularly preferable to provide a tensioning device via which pretensioning of the bars in relation to the frame is adjustable. This makes it possible, if necessary when providing a covering, to also adjust the covering's tension in order to compensate any slight tolerances as required. The separation of frame and bars with adjustable pretensioning of the bars has the advantage that the arch/length of the bars can be adjusted regardless of a possible curvature of the plane which is described by the opening defined by the frame. In contrast, with an integral configuration, the depth of the storage area, for example, is specified by the curvature of the curved plane described by the opening. Moreover, with the separate configuration of frame and bars, it is possible by means of suitable guidance and mounting of the ends of the bars to implement not only a first-order bending line but also higher order bending lines of the bars in the ending position and starting position respectively. Reference is made here by way of example to the s-shaped bending line already described above.

In order to stiffen the storage area and to improve the tactile quality, the frame and/or the bars may be encased with a layer of foam material (e.g. PU, EPP or EPS foam). It is also conceivable that the frame and/or the bars themselves consist of foam material.

In addition, it may be preferable to provide a coating in the region of the frame and/or bars which covers the layer of foam material such as a Makrolon® layer (PC layer) which serves as a decorative and/or wear protection layer.

According to one embodiment of the present invention, the opposing legs of the frame run in the horizontal direction. That is to say, their main or longitudinal extension runs essentially in the horizontal direction (from left to right or vice versa). This configuration is used in particular if the present invention forms an open storage receptacle.

On the other hand, however, it is also conceivable to configure the storage area to accommodate a beverage container, e.g. a bottle, a can or a beaker. With this alternative configuration, the opposing legs of the frame run in the vertical direction, i.e. they extend essentially from bottom to top or vice versa. This latter configuration is particularly advantageous without covering, whereby in this case a solid base could be provided underneath the opening of the frame. Alternatively, a flexible base can also be formed with the help of a covering. If the covering does not join the bars to each other but only joins each bar to the frame, a base may be defined between the bar and the frame or rear wall when the bar is bent outwards.

So as to be able to create a closed, uniform and aesthetically pleasing surface structure in a case in which all the bars are in the starting position, it is preferable for the bars to lie in their starting position in a curved plane which is described by the opening defined by the frame. In particular, if a covering is provided over the bars and preferably over the frame, then in this case a closed surface arises along the curved plane or parallel to it. Particularly when integrated in a dashboard, the result is therefore a recess-free outer contour of the dashboard in the region of the storage area when all the bars are in the starting position while an open receptacle for storage can be created by moving individual bars or all the bars into the ending position.

Further advantages and features of the present invention, which may be implemented singly or in combination with one or a plurality of the features referred to above, insofar as the features do not interfere with each other, are apparent from the following description of exemplary embodiments. This description is provided with reference to the associated drawings which show:

FIG. 1 a schematic perspective view of a storage area according to a first embodiment of the invention;

FIG. 2 a cross-section along line 2-2 in FIG. 1;

FIG. 3 a cross-section of an alternative embodiment similar to the illustration in FIG. 2; and FIG. 4 a further alternative embodiment of the present invention in a perspective view from above.

FIG. 5 shows a further alternative configuration of the present invention in a perspective view;

FIG. 6*a-c* shows the rotatable mounting of a bar in schematic cross-sectional views;

Identical or comparable elements in the following drawings are identified by identical reference numerals.

FIG. 1 shows a storage area according to the present invention in a first configuration.

Figure 5:
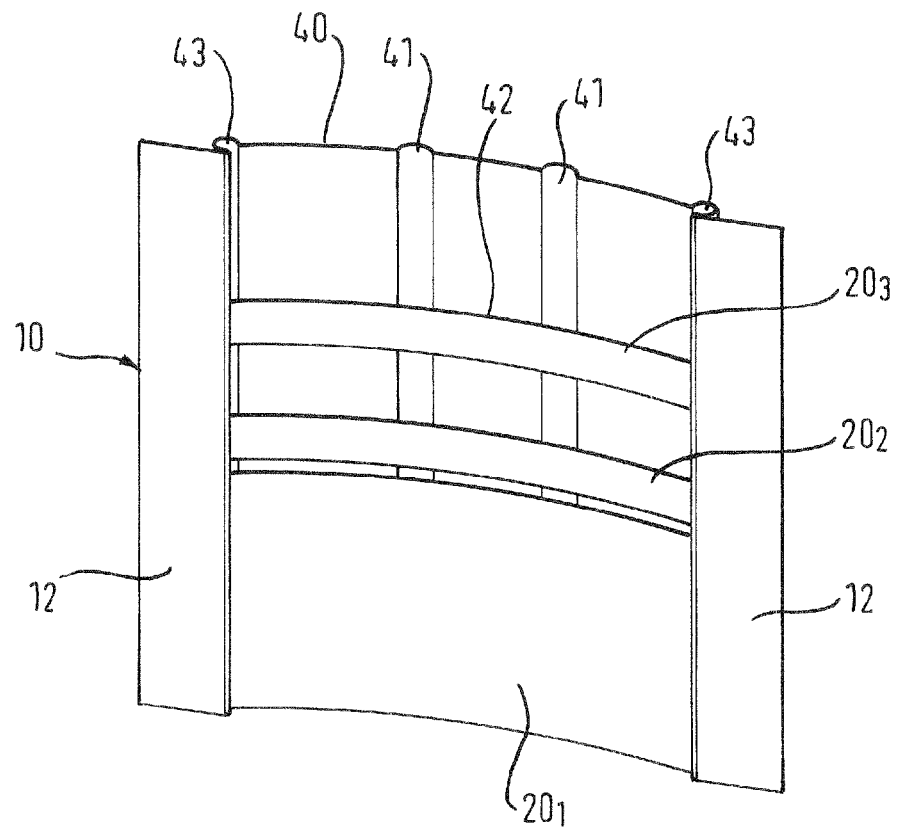

The storage area has a frame 10 and a plurality of bars 20$_1$ to 20$_6$. Frame 10 is integrated in a dashboard 30. That is to say, it can be arranged in dashboard 30 bonded to it or configured integrally with it. Frame 10 has two opposing legs 12 and two further opposing legs 13. In this case, legs 13 each join opposing legs 12. Frame 10 defines an opening 11 which is bounded by legs 12 and 13. Moreover, in the embodiment in FIGS. 1 and 2, opening 11 describes a curved plane, such as is apparent for example from the section in FIG. 2, whereby the curvature of the plane is essentially adapted to the outer contour prescribed by dashboard 30. Frame 10 may be made of plastic or a metal.

In the embodiment illustrated, the storage area further comprises six bars which may be configured identically or differently. In particular, it is preferable, as in the embodiment illustrated, for the bars to extend essentially parallel to each other. In addition, the bars extend here from one leg 12 to opposing leg 12 and therefore also essentially parallel to legs 13 joining legs 12. However, in this respect other configurations are also conceivable. In particular, the shape of opening 11 is not limited to an angular, especially not a quadrangular shape. Rather, multiangular or round and other shapes are also conceivable. Legs 12 also need not run in a straight line but could run in a wave shape or be curved. The same applies to legs 13. Moreover, legs 12 in the embodiment illustrated and when integrated in a dashboard 30 run essentially in a horizontal direction, i.e. from left to right. In other words, their main extension is of a horizontal nature.

Bars 20 may likewise be formed of plastic or metal. The bars may have a round (circular, oval or similar) cross-section or an angular cross-section whereby they may be configured wider than they are high (flat). Moreover, bars 20 are configured in each case as a bi-stable system, i.e. they have two stable states, the starting position and the ending position. In this case the starting position, as is apparent from FIG. 2, is preferably selected such that the upper side of bars 21 aligns with upper sides 15 of frame 10 and the upper side of dashboard 30 such that a closed surface is created in the starting position. By applying an impulse, the bars are brought in each case from one position to the other but are unstable in intermediate positions and depending on the intermediate position spring (automatically) either into the starting position or the ending position. Euler's buckling modes and beam theory are used for designing this system.

In FIG. 2, bar $20_2$ is located in the ending position while bar $20_1$ is in the starting position. Similarly, bars $20_3$ and $20_6$ in FIG. 1 are located in the ending position while bars $20_4$ and $20_5$ are in the starting position. To be able to move from the starting position to the ending position, the bars must pass through an intermediate position in which their longitudinal extension between legs 12 is greater than in the respective ending or starting positions. It must be possible to compensate this length either by means of the material of the bars or one or both ends of bars 20 must be movably supported or guided in frame 12 in their longitudinal direction. In addition, the ends may also be rotatably supported about an axis perpendicular to the longitudinal extension of the bars and/or parallel to legs 12. The excess length in the intermediate position, for an integral configuration of bars 20 with frame 10 for example, may also be effected by means of an integral hinge or a deformation of the bars.

Alternatively to a first-order bend, such as is illustrated in FIG. 2, second-order (or higher) bending lines such as are illustrated in FIG. 3 are also conceivable. However, displacement of both ends and a rotatable arrangement of both ends are necessary for this.

To bring bars 20 out of their starting position into the ending position or out of the ending position into the starting position, it is possible to act manually on the bars until they pass through the intermediate position and spring into the ending position. If dashboard 30 and therefore frame 10 is accessible from underneath, the bars can be pushed back out of the ending position into the starting position in the same way. Alternatively, it is conceivable to pull on bars 20 from above in order to bring them back from the ending position into the starting position whereby the bars serve in this case as a handle or additionally and, as not illustrated, are designed with an appropriate configuration and with the moulding as a handle, e.g. having a tab, an adjusting wheel or an adjusting lever. Alternatively, tabs, rings or loops may also be provided, e.g. sewn on, on a covering that is not illustrated.

Such a covering is advantageously pulled over frame 10 and bars 20 to form a closed surface. In this case, the covering may rest loosely on bars 20 or their upper side 21 (FIG. 2). Alternatively, it would also be conceivable for the covering to be attached or joined to upper side 21 of bars 20.

Alternatively, the covering could also be provided under the bars, but in this case would preferably be joined to underside 22 of the bars.

In addition to manual operation of the bars, it would also be conceivable to provide an automatic positioning device (not illustrated). For this case, it is conceivable to provide either a drive which moves the bars at least at one end 24 in the longitudinal direction of the bars, i.e. in a direction between legs 12, and/or twists the bars about an axis 23 parallel to legs 12 or perpendicular to the longitudinal extension of the bars along direction A, in particular beyond the intermediate position, such that the bars can take up the starting position or the ending position.

Alternatively, it is also conceivable to form bars 20 at least in portions from a shape memory material and to configure the positioning device such that it comprises an activation device for activation of the shape memory material. In this case, a two-way effect in particular must be chosen in which the shape memory alloy can take up the shape in the starting position at one point and the shape in the ending position at another point. At the same time, the activation device may be a thermal device which correspondingly heats or cools the bars or which brings about the heating or cooling by means of voltage induction, e.g. by the application of a voltage, a magnetic field, etc.

Preferably, an input device (not illustrated) is also to be provided via which a user can select the bars independently of each other and can move them into the ending or starting position. Certain position patterns are also conceivable which can be stored and selected via the input device in the manner already explained at the outset.

It is further conceivable to provide a tensioning device (not illustrated) which renders it possible to adjust the pretensioning of the bars. It is also conceivable to encase bars 20 and/or frame 12 in foam or to manufacture them/it from foam material in order to stiffen bars and frame and to improve them in respect of the tactile quality. Furthermore, it may be preferable to provide a decorative layer over the foam layer or the foam material which may be formed, for example, by the covering or by means of another layer such as a Makrolon® layer for example.

With the configuration in FIG. 4, the only difference is that either no covering is to be provided, but opening 11 which is defined by frame 12 is closed by an inherently stable base 14, or a covering is to be provided between a respective bar 20 and legs 12 and/or 13. A further difference is that legs 12 run essentially in the vertical direction from top to bottom.

In the ending position, for example, the bars lie against base 14.

In the following, the function of the storage area according to the invention will be explained with reference to the drawings in FIGS. 1, 2 and 4.

Depending on the user's wish, one or a plurality of bars $20_1$ to $20_6$ may be brought or moved out of the starting position into the ending position. In the embodiment illustrated in FIG. 1, bars $20_2$ and $20_3$ in addition to $20_6$ are located in the ending position while bars $20_1$, $20_4$ and $20_5$ are in the starting position. As a result, an open receptacle is formed between bars $20_1$ and $20_4$ and a further open receptacle between bar $20_5$ and leg 13. These open receptacles are used to store objects and form a type of recess in dashboard 30. The open receptacles are separated from each other by bars $20_5$ and $20_4$.

Alternatively, it is also conceivable to bring all bars $20_1$ to $20_6$ into the ending position, whereby one large open receptacle or one large recess and therefore a large storage area is created. A further alternative would be to bring all bars $20_1$ to $20_6$ into the starting position which would result in a completely closed continuous surface with a pleasing outer appearance, particularly where a covering is provided over bars 20, frame 10 and dashboard 30. These examples are naturally not exclusive and bars $20_1$ to $20_6$ may be brought into the ending position or starting position independently of each other in order to form different types of topography. At the same time, this may take place manually or by means of a motor as was described above.

With the configuration in FIG. 4, bars $20_1$ and $20_2$ are located in the starting position while bars $20_3$ and $20_4$ are in the ending position. As a result, bars $20_1$ and $20_2$ form a holder for a container, e.g. a beverage can 40, which can be accommodated in the storage area. Depending on the height of the container, a greater or smaller number of bars 20 may be brought into the starting position or ending position to ensure that the container is held securely. It would be particularly preferable here to configure the bars in a different manner from that illustrated so as to be especially wide and with only a small gap between the bars such that the bars produce an essentially closed continuous surface if no beverage container is to be accommodated and all bars 20 are arranged in the starting position.

FIG. 5 shows a configuration of the present invention comparable to that in FIG. 4. Frame 10 has opposing legs 12 between which three bars $20_1$-$20_3$ extend in the embodiment illustrated. Bars $20_1$-$20_3$ are located in the starting position in FIG. 5. A concave curved rear wall 40 which is correspondingly adapted to the curvature of bars 20 in the starting position illustrated extends between legs 12 behind frame 10. Bars 20 lie in this case, as illustrated in FIG. 5, flush with the side of rear wall 40 that faces outwards. Two finger recesses 41 which form part of a circle in cross-section are provided in rear wall 40. Finger recesses 41 in FIG. 5 extend parallel to legs 12 of frame 10 along their entire length. In addition, these grip recesses are located between highest point 42 of each of bars 20 and respective guides 43 at the ends of bars 20. The operating forces are lowest at this point and thus enable the bars to be moved easily between the starting position and the ending position illustrated.

The guides in the embodiment illustrated are configured as concave channels in frame 10 or between frame 10 and rear wall 40. The ends of bars 20 each have cylindrical mountings which may be integrally joined or glued to bars 20. Cylinders 44 are guided in guides 43 as can best be seen from FIG. 6. Due to pretensioning of bars 20, the bars spread at right angles to guides 43 such that they can absorb forces in the guiding direction and moderately loaded compartment bases do not lead to slipping of the element.

Figure 6:
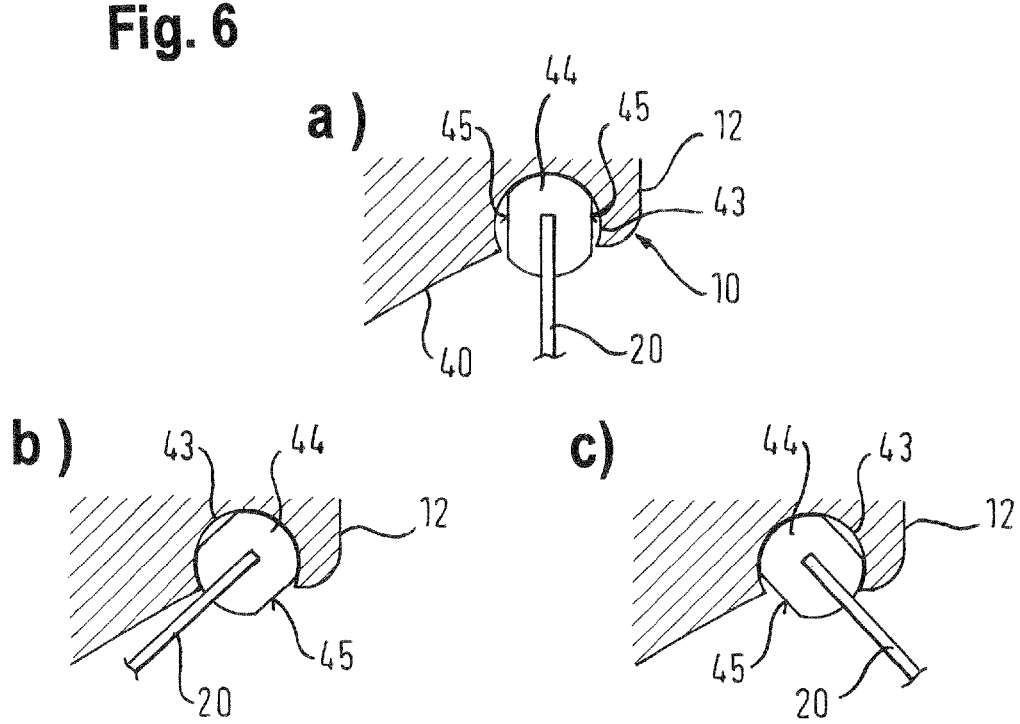

The pivot angle from the starting position illustrated to the ending position is generally significantly smaller than 180°. The guide may enclose cylinder 44 by more than 180° as illustrated in FIG. 6 to prevent cylinder 44 from being pulled out of guide 43 in the event of abuse or a crash. Cylinder 44 may be flattened on opposing sides 45 to nevertheless enable the replacement of bars or to enable installation in the case of guides 43 which are closed top and bottom. As a result, in an installation position such as illustrated in FIG. 6a, cylinder 44 can be removed from or inserted into guide 43 to enable replacement or installation of bars 20. In the starting position illustrated in FIG. 6b, however, cylinder 44 is held securely in guide 43. The same applies to the ending position illustrated in FIG. 6c. When moving from the starting position into the ending position, i.e. on snapping through of bars 20, the installation position is passed through, whereby, however, the transverse forces ensure, as mentioned, that cylinders 44 are pressed into guides 43 and therefore it is not possible for them to slip out in this case. In the ending and starting positions, cylinders 44 are securely enclosed and therefore prevented from slipping out. Alternatively, snap-in connections would also be conceivable, whereby in this case guides 43 would be configured only slightly larger than 180° and the bearings would be formed by full cylinders which can be snapped in by spreading open the guides.

As is further apparent from FIG. 5, the guides run completely along legs 12 and are therefore configured continuously. As a result, it is possible to move individual bars $20_1$-$20_3$ along the guides and thus along legs 12.

Figure 7:
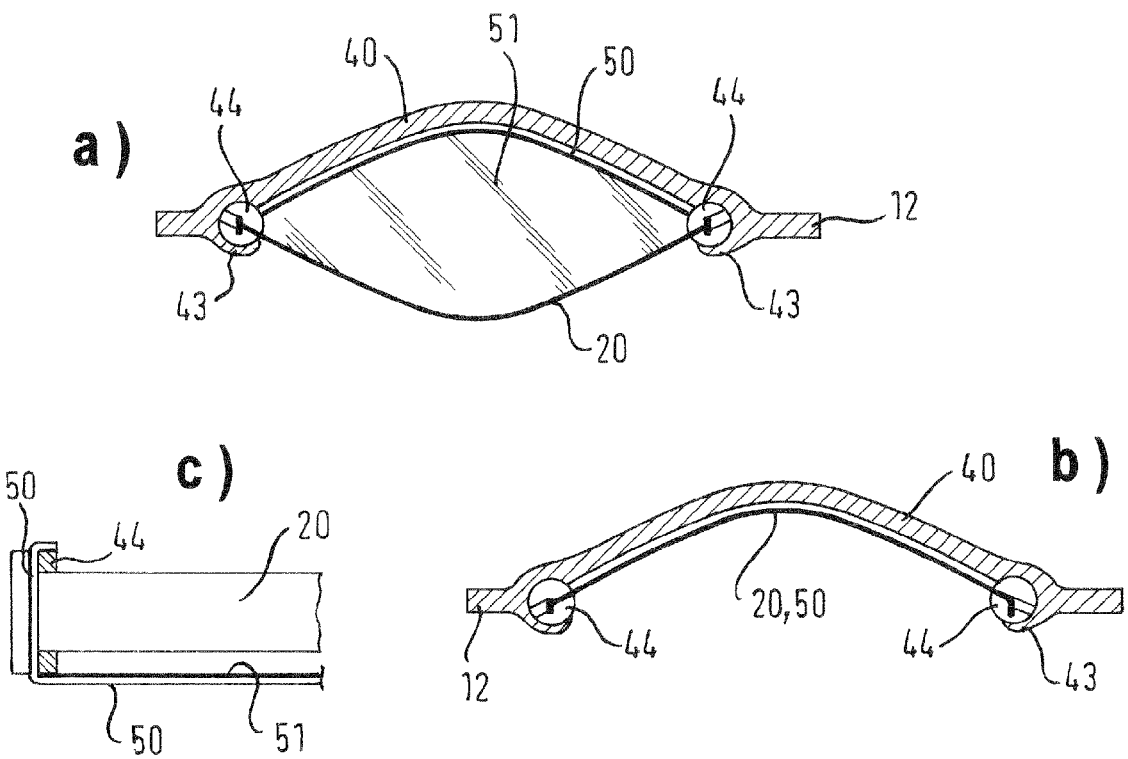
FIG. 7 shows a cross-sectional view through a bar with flexible base in a) ending position and b) starting position, whereby in FIG. 7*c* the fixing of the flexible base is illustrated schematically.

Base 51 must be movable together with bar 20 in order to also permit this for bars which have a flexible base 51. As illustrated in FIG. 7, in order to implement this, a holding device 50, here in the form of a curved wire, may be joined to the bearings, here cylinders 44, in such a way that rotation of cylinders 44 in guides 43 does not lead to rotation of holding device 50. Rather cylinder 44 can twist relative to holding device 50. As illustrated in FIG. 7c, this may be implemented in that holding device 50 is accommodated loosely along the longitudinal direction of cylindrical bearing 44 in a centred through-hole and is merely held on the upper face of cylinder 44 in the vertical direction to prevent it slipping out downwards. In FIG. 7c, this takes place at the top by resting on the face of cylinder 44 such that a secure support is ensured when an object is inserted onto base 51. An extensible base 51 is joined to holding device 50. That is to say, one side of base 51 is joined to holding device 50 while the opposing side is joined to a lower edge in the vertical direction of bar 20. If bar 20 moves out of the starting position illustrated in FIG. 7b into the ending position illustrated in FIG. 7a, then holding device 50, here the curved wire, holds the one side of base 51 adjacent to rear wall 40 while bar 20 pulls the opposing side of base 51 away from the rear wall and stretches base 51 as a result. This creates a storage area which is open at the top. Such a bar $20_1$ is preferably used in FIG. 5 right at the bottom, namely for bar $20_1$. Such a wide bar $20_1$ may additionally be perforated or open-worked to keep the operating forces moderate as was described previously. A thin flexible covering of bar $20_1$ using foils, materials, etc. may ensure opacity.

Bar $20_2$ may also be provided advantageously with a flexible base 51 of this type such that the opening of the receptacle, which is achieved by bar $20_1$ in the position illustrated in FIG. 7a, can be closed by bringing bending bar $20_2$ and its base 51 into the ending position. A storage area open at the top would additionally be formed by second bar $20_2$ with flexible base 51. Third bar $20_3$ in FIG. 5 is further used to wedge in objects for which purpose bar $20_3$ is brought into the ending position. Following this, objects, e.g. a map or any other objects, are placed between the inside of bar $20_3$ and rear wall 40 after which a movement takes place from the ending position towards the starting position and the object is wedged in between the inside of bar $20_3$ and rear wall 40. This bar $20_3$ would thus be comparable to a retaining strap. Due to the movability of individual bars $20_1$-$20_3$, as was referred to above, it is conceivable beyond this to move the bars relative to each other in the vertical direction for which purpose cylinders 44 may be moved longitudinally in guide 47 [sic] or may be first disengaged in the installation position and re-installed in a different position.

Figure 8:
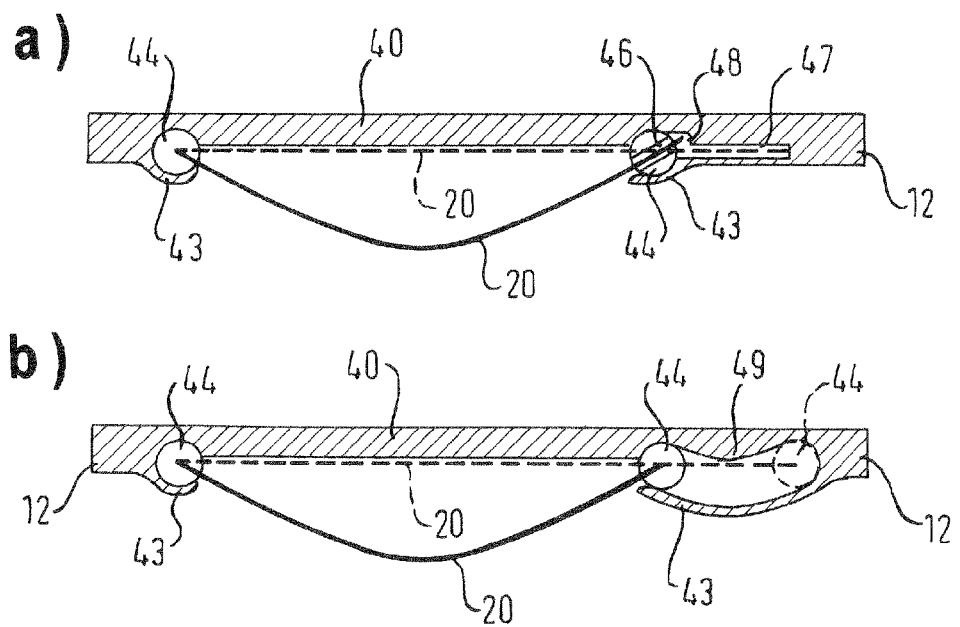
FIG. 8 shows schematically a cross-sectional view for the movable mounting of at least one end of the bars with a) the end of the bar movable relative to the bearing and b) movable bearing.

According to a further embodiment, it is also conceivable to configure rear wall 40 not as a concave curve but as a straight line as illustrated in FIG. 8. It is preferable to configure bars 20 to be movable at least on one side in order to prevent obstruction of bars 20 when snapping through between the two bi-stable positions. This is then also usable if rear wall 40 is curved so as to be slightly convex and therefore is particularly necessary because the bars are not essentially extensible longitudinally but are only flexible to bending. As in FIG. 8a, the movability can be achieved, for example, in that cylinder 44 joined at one end to bar 20 has a cut-out 46 adapted to the shape of the cross-section of bar 20 through which cut-out the end of bar 20 penetrates. That is to say, the end of bar 20 and therefore the mounting can move relative to cylinder 44. In FIG. 8a, bar 20 is illustrated in the ending position by the unbroken line and in the starting position by the broken line. In addition, a cut-out 47 [sic] is configured in the region of guide 43 to accommodate the end of bar 20 in the starting position and a recess 48 which limits the relative movement of the end of bar 20 in the ending position. If bar 20 is moved out of the ending position illustrated in FIG. 8a (shown by the unbroken line) from the ending position into the starting position (shown by the broken line), then the end of bar 20 moves into the recess 47 [sic] in order to thus ensure that bar 20 lies closely against rear wall 40.

Alternatively, it is also conceivable as illustrated in FIG. 8b to configure guide 43 such that bearing 44 is itself movable essentially parallel to rear wall 40. For this purpose, a guide is provided in guide 43 which comprises a cam 49 which must be travelled over when moving from the starting to the ending position and vice versa. If bar 20 in FIG. 8b is moved out of the ending position illustrated by the unbroken line into the starting position illustrated by the broken line, then with the application of appropriate force bearing 44 moves over cam 49 until bar 20 lies closely against rear wall 40.

The procedure in FIGS. 8a and 8b is merely reversed each time that bar 20 is moved out of the starting position into the ending position.

The present description of exemplary embodiments is naturally not exclusive and many modifications and other applications of the present invention will be apparent to the person skilled in the art. In particular, the invention is not restricted, for example, to the number of bars provided. There must merely be at least two bars present, however, there are preferably three or more since the adaptivity of the storage space may be increased by the number of bars.

The invention claimed is:

1. A storage area for vehicles, comprising:
a frame having opposing legs, an opening defined by the frame is formed in a curved plane between the opposing legs;
a rear wall behind the frame and facing the opening; and
a plurality of bars extending from one of the opposing legs of the frame to the other leg, wherein the bars are each implemented as a bi-stable system, so that the bars are movable toward and away from the rear wall independently of each other between a starting position and an ending position,
wherein the bars lie in the curved plane in the starting position and the bars lie against the rear wall in the ending position.

2. The storage area according to claim 1, further comprising a covering which is arranged at least in the region of the opening defined by the frame.

3. The storage area according to claim 2, wherein the covering is reversibly extensible.

4. The storage area according to claim 1, further comprising a handle for manual movement of the bars between the starting position and the ending position.

5. The storage area according to claim 1, wherein at least one recess is provided in the rear wall which permits intervention between the rear wall and at least one of the bars in order to move the bars between the starting position and the ending position.

6. The storage area according to claim 1, wherein a mounting of the bars is formed by a cylindrical element which is rotatably accommodated in a guide.

7. The storage area according to claim 6, wherein the guide encloses the cylinder by more than 180°.

8. The storage area according to claim 7, wherein the cylinder is flattened on both sides in order to be able to remove the cylinder from the guide in an installation position between the starting position and the ending position.

9. The storage area according to claim 1, further comprising a positioning device for automatically moving the bars between the starting position and the ending position.

10. The storage area according to claim 9, wherein the positioning device includes a drive via which at least one end of each bar or its mounting is movable in the longitudinal direction of the relevant bar and/or is rotatable about an axis perpendicular to the longitudinal extension in order to move the bar between the starting position and the ending position.

11. The storage area according to claim 9, wherein the bars are formed at least in portions from a shape memory material and the positioning device includes an activation device for activating the shape memory material in order to move the bars between the starting position and the ending position.

12. The storage area according to claim 9, wherein the positioning device includes an input unit via which individual bars are selectable and movable independently of each other and/or predefined position patterns of the bars in relation to each other are selectable.

13. The storage area according to claim 1, wherein the frame and the bars are configured integrally.

14. The storage area according to claim 1, wherein the bars are configured separate from the frame and a tensioning device is provided via which pretensioning of the bars in relation to the frame is adjustable.

15. The storage area according to claim 1, wherein the frame and/or the bars are encased with a foam layer.

16. The storage area according to claim 1, wherein the frame and/or the bars consist of a foam material.

17. The storage area according to claim 16, wherein the frame and/or the bars have a coating covering the foam material.

18. The storage area according to claim 1, wherein the opposing legs of the frame run in the horizontal direction.

19. The storage area according to claim 1, wherein the opposing legs of the frame run in the vertical direction.

* * * * *